W. T. DONNELLY.
METHOD OF SECURING WOODEN PARTS.
APPLICATION FILED DEC. 6, 1917.
1,273,771.
Patented July 23, 1918.
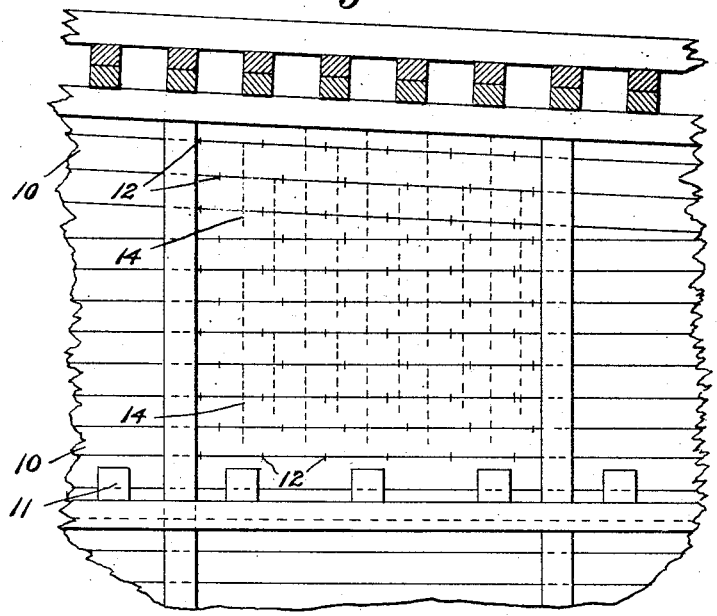
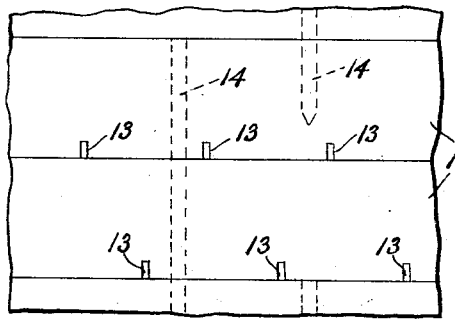
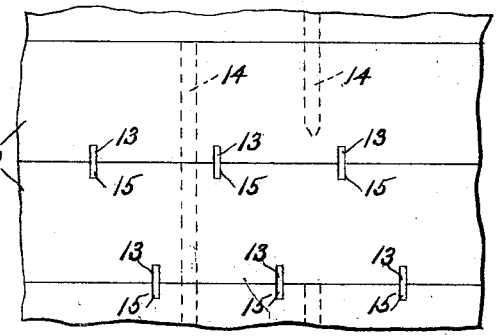
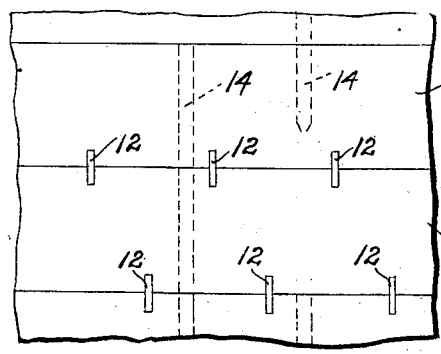
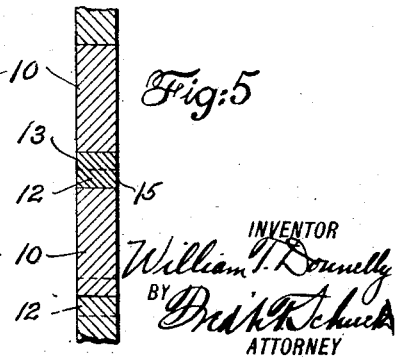

UNITED STATES PATENT OFFICE.

WILLIAM T. DONNELLY, OF BROOKLYN, NEW YORK.

METHOD OF SECURING WOODEN PARTS.

1,273,771.

Specification of Letters Patent.

Patented July 23, 1918.

Application filed December 6, 1917. Serial No. 205,797.

*To all whom it may concern:*

Be it known that I, WILLIAM T. DONNELLY, a citizen of the United States, and a resident of Brooklyn, in the county of Kings and State of New York, have invented certain new and useful Improvements in Methods of Securing Wooden Parts, of which the following is a specification.

The invention relates to a method of securing wooden parts or timbers, for example in the building up of bulk-heads or other partitions as employed in marine work and which are subject to a shearing stress. It has for its object to effect in a simple, economical and expeditious manner the building up of a compound beam or structure, similar to a plate girder as employed in steel construction, and to positively insure, with a minimum amount of metal, against shearing action between the respective members thereof.

To this end, the invention consists in first providing in one face of a pair of coacting members of a compound beam or the like a transverse groove or kerf, then securing the members in position by means of drift bolts, whereupon similar grooves or kerfs are cut in the coacting surfaces by inserting the proper tool into the first-named kerfs and cutting from same into the said coacting members. In this manner, absolute alinement or registry of the coacting kerfs is first insured; and, thereupon, suitable thin metal shear plates are driven through both kerfs thus provided to afford sufficient resistance to the shear stresses set up.

In the accompanying drawings, which illustrate the invention—

Figure 1 is an elevation of a bulkhead formed in accordance with the invention.

Figs. 2, 3 and 4 are detail views illustrating the various steps in securing the wooden parts together.

Fig. 5 is a fragmentary vertical section.

Similar characters of reference designate corresponding parts throughout the several views.

Referring to the drawings, 10 designates a plurality of superposed timbers forming a bulkhead, 11 designating deck beams arranged transversely thereto. The invention, as exemplified in the present embodiment, consists in so uniting these various superposed timbers that a unitary structure or compound beam is obtained similar to a plate girder of steel construction, and whereby the shearing stresses set up are resisted by plates 12 of metal, disposed throughout the structure transversely to the said bulkhead. To this end, each of the beams is provided along its length, preferably under the undersurface, with a transverse narrow groove or kerf 13, Fig. 2, before the said beams are secured to each other in the usual manner by drift bolts 14 or the like. It will be appreciated, after the beams are thus united and no provision such as a groove 13 having been made, that it is practically impossible to cut through the coacting portions of same and provide suitable opening to admit of a shear plate, as herein proposed. However, by first providing the various beams with the kerfs 13, as hereinbefore set forth, and then securing the said beams by means of the drift bolts, a proper tool (not shown) may be readily inserted to cut a corresponding kerf 15, Fig. 3, into the upper surface of the adjacent or coacting timber. Furthermore, perfect alinement and registry is thereby insured, and it becomes a very simple matter thereafter to insert and drive through a proper shear plate 12, Figs. 4 and 5, which will provide the necesary section of metal to overcome the shearing stresses set up in the compound beam thus produced. These metal plates may be made comparatively thin, and an extremely rigid compound beam is provided by their use, as hereinbefore disclosed.

I claim:

1. The method of securing wooden parts together which consists in providing a groove or kerf in the surface of one of said members, permanently securing said members in position, cutting through said kerf another kerf in the coacting surface to register therewith, and finally driving a suitable shear plate through the double kerfs thus produced.

2. The method of securing wooden parts together, which consists in providing a groove or kerf in the surface of one of said members, driving drift bolts through the members to permanently secure the same in position, cutting through said kerf another kerf in the coacting surface to register therewith, and finally driving a suitable shear plate through the double kerfs thus produced.

3. The method of securing wooden parts together, which consists in cutting a narrow groove or kerf transversely in one of said members, permanently securing said members in position, cutting through said kerf another kerf in the coacting surface to register therewith, and finally driving a suitable shear plate through the double kerfs thus produced.

4. The method of securing wooden parts together, which consists in providing a groove or kerf in the surface of one of said members, permanently securing said members in position, cutting through said kerf another kerf in the coacting surface to register therewith, and finally driving a metal shear plate through the double kerfs thus produced.

5. The hereindescribed method of constructing a compound beam of wood, which consist in superposing a plurality of timbers provided with grooves or kerfs in one face, permanently securing said members in position by driving drift bolts therethrough, cutting through said kerfs corresponding kerfs in the coacting surfaces to register with the first-named kerfs, and finally driving a suitable shear plate through the double kerfs.

Signed at New York, in the county of New York and State of New York, this 1st day of December, A. D. 1917.

WILLIAM T. DONNELLY.

Copies of this patent may be obtained for five cents each, by addressing the "Commissioner of Patents, Washington, D. C."